2,806,578

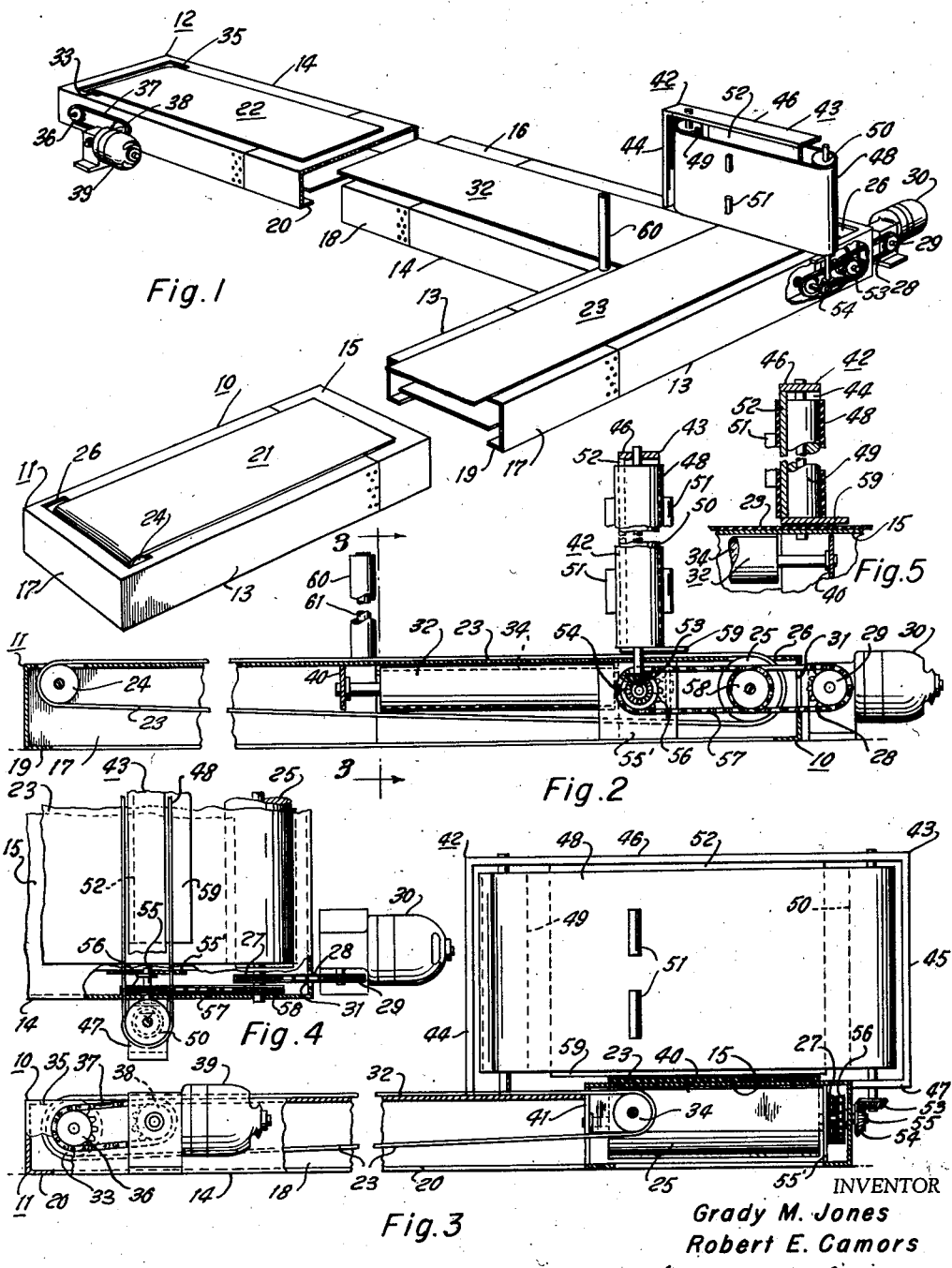
Sept. 17, 1957    G. M. JONES ET AL    2,806,578
TRANSFER MECHANISM FOR CONVEYOR SYSTEM
Filed Oct. 18, 1954
INVENTOR
Grady M. Jones
Robert E. Camors
BY
ATTORNEYS

TRANSFER MECHANISM FOR CONVEYOR SYSTEM

Grady M. Jones and Robert E. Camors, Dallas, Tex.

Application October 18, 1954, Serial No. 462,702

1 Claim. (Cl. 198—20)

This invention relates to new and useful improvements in conveyor systems.

One object of the invention is to provide an improved conveyor system of such construction as to change automatically the direction of movement of articles from one line of travel to another line of travel in angular relation thereto.

Another object of the invention is to provide an improved conveyor system having a pair of endless conveyors disposed in angular coacting relation to each other and conveyor means arranged to direct articles carried by one of the conveyors from said conveyor onto the angularly related conveyor whereby direction of travel is changed automatically without appreciably altering the plane of movement of the articles.

An important object of the invention is to provide an improved conveyor system having a pair of endless belt conveyors disposed in a substantially common horizontal plane and in transverse intersecting relation with an upright endless conveyor overlying the intersecting conveyors and traveling in the same direction as one of said conveyors for moving articles onto the latter conveyor from the other of said conveyors.

A particular object of the invention is to provide an improved conveyor system, of the character described, wherein the upright conveyor extends transversely of the intersecting end portion of one of the feeding conveyors and longitudinally of the outer margin of the receiving conveyor and coacts with means at the intersecting inner margins of said conveyors for turning and directing articles of a length greater than the width of said receiving conveyor onto the latter conveyor.

Another object of the invention is to provide an improved conveyor system, of the character described, which is particularly adapted to handle articles, such as luggage, of different size, weight and contour.

A construction designed to carry out the invention will be hereinafter described, together with other features of the invention.

The invention will be more readily understood from a reading of the following specification and by reference to the accompanying drawing, wherein an example of the invention is shown, and wherein:

Fig. 1 is a perspective view, partly in section, of a conveyor system constructed in accordance with the invention, Fig. 2 is a longitudinal, sectional view of the feeding conveyor, Fig. 3 is a longitudinal, sectional view of the receiving conveyor, taken on the line 3—3 of Fig. 2, Fig. 4 is a plan view, partly in section, showing the driving connection of the feeding and upright conveyors, and Fig. 5 is a transverse, vertical, sectional view of the lower portion of the upright conveyor.

In the drawing, the numeral 10 designates the substantially horizontal frame of a conveyor embodying the principles of the invention and including a pair of legs or sections 11 and 12 in angular relation to each other. Although shown as right angular or L-shaped, it is noted that the frame may have its legs disposed in any suitable angular, intersecting relationship. Preferably, the frame legs 11 and 12 are formed of channel members 13 and 14 connected end to end and having upwardly-facing, flat plates or webs 15 and 16 and upright, marginal flanges 17 and 18. Inwardly-directed, horizontal feet 19 and 20 are coextensive with the lower margins of the flanges for increasing the rigidity of the channel members. As shown in Fig. 3, the flanges 17 of the channel members 13 are of slightly greater height than the flanges 18 of the channel members 14 so that the webs 15 are disposed above the webs 16 and the latter may be of greater width than said webs 15. The inner or intersecting end of the frame leg 12 is open and is suitably secured to the flange 17 at the inner longitudinal margin of the frame leg 11 in spaced relation to the inner end of said leg.

Endless conveyors 21 and 22 extend longitudinally of and are supported by the frame legs. The feeding conveyor 21 includes a belt 23 and transverse pulleys or rollers 24 and 25 extending across the ends of the leg 11 and suitably journaled for rotation between the longitudinal flanges 17 (Fig. 2). For accommodating the pulleys and the upper flight of the conveyor belt, transverse openings 26 are formed in the end portions of the webs 15 whereby said upper flight may overlie and be supported by said webs. A sprocket 27 is carried by the shaft of the inner pulley 25 for driving engagement by an endless chain 28 with the drive sprocekt 29 of a reduction gear motor 30 mounted externally of the frame leg, the chain extending through an opening 31 in the end flange. It is noted that the inner pulley is positioned inwardly of the conveyor 22 so that the belt 23 extends inwardly beyond said conveyor.

The receiving conveyor 22 is similar and includes an endless belt 32 overlying the webs 16 of the channel members 15 and transverse supporting pulleys 33 and 34 of the ends of the leg 12 with a transverse opening 35 being formed in the outer end of the web of the outermost channel member for the outer pulley 33 and the upper flight of the belt. An external sprocket 36 is mounted on one end of the shaft of the outer pulley, which extends through the longitudinal flange 18, for driving engagement by an endless chain 37 with the drive sprocket 38 of a reduction gear motor 39. The inner pulley 34 is suitably journaled below the web 15 of the innermost channel member 13 between upright plates 40 extending transversely between the longitudinal flanges 17 of said member, whereby the upper flight of the belt 32 is contiguous to said web and the overlying belt 23. An opening 41 is formed in the inner longitudinal flange 17 in alinement with the leg 11 for accommodating the belt. It is noted that the belts 23 and 32 are driven or pulled at their discharge ends with the upper flight of said belt 23 traveling toward said belt 32 and the upper flight of the latter moving away from the former. Conventional means (not shown) may be provided for maintaining the desired tautness of the belts.

For directing articles carried by the belt 23 onto the belt 32, an upright endless conveyor 42 extends transversely of the inner or discharge end of the feeding conveyor 21 outwardly of the pulley 25 and the inner end of the leg 11 and in substantial alinement with the outer longitudinal margin of the frame leg 12. The upright conveyor includes an open frame 43 of inverted U-shape having upstanding members or standards 44 and 45 connected at their upper ends by a substantially horizontal member or transverse head 46. It is noted that the frame is of a length greater than the width of the leg 11 so as to extend beyond the longitudinal margins thereof with its member 44 secured to the web 16 of the innermost channel member 14 and its member 45 overhanging and projecting beyond the outer longitudinal flange 17 of the innermost channel member 13. An inwardly-directed flange 47 is provided on the lower end of the member 45 for connection with the flange 17 (Fig. 3). The turning conveyor 42 has an endless belt 48 supported by upright pulleys 49 and 50 mounted at the ends of the frame 43 between the head 46 and the web 16 and flange 47. As will be explained, cleats or lugs 51 extend transversely of the belt at spaced intervals. An upright plate or web 52 depends from the head between the pulleys for supporting or providing a backing for the inner flight of the belt 48 adjacent and facing the intersecting conveyor belts 23 and 32. The pulley 50 has its shaft extending through the flange 47 and a miter gear 53 is mounted on the projecting end for meshing engagement with a complementary gear 54 carried by a stub shaft 55 suitably supported within the innermost channel member 13 between its longitudinal flange and an upright, parallel plate 55'. A sprocket 56 is mounted on the shaft 55 and is connected by an endless chain 57 to a drive sprocket 58 carried by the shaft of the pulley 25, whereby the pulley 50 is driven in a direction to cause travel of the belt 48 in the same general direction as the belt 32. As a result, the inner flight of the upright belt moves inwardly across the feeding belt toward the receiving belt. In order to prevent the lower margin of the upright belt from engaging and wearing against the underlying feeding belt, said upright belt may be supported on its pulleys 49 and 50 against downward movement by a horizontal flange 59 on the lower end of the plate 52 and extending inwardly beneath the outer or rear flight of said upright belt and above said feeding belt as shown most clearly in Fig. 5.

In use of the conveyor system, articles are placed on any portion of the belt 23 outwardly of the belt 48 and may be disposed in any position and at random or irregular intervals. Since the conveyor system is particularly adapted to handle luggage, baggage and other articles which may be bulky and vary in size, weight and contour, the articles may be positioned longitudinally or transversely of the belt and may extend beyond the margins of said belt. The articles travel with the belt 23 so as to be moved into engagement with the upright belt 48 and, due to the transverse travel of the latter belt, said articles are moved transversely of said feeding belt and directed toward and onto the receiving belt 32. Obviously, this transverse movement of the articles is assisted by the cleats 51 engaging said articles and the constant travel of the feeding belt which holds said articles in contact with the upright belt. Although some articles may be turned by the upright belt, such as elongated articles positioned longitudinally of the feeding belt, transversely positioned articles and articles having substantially equal transverse dimensions merely slide across the latter belt without appreciable turning. In order to facilitate the turning of elongated articles, a roller 60 may be mounted on an upright post or shaft 61 at the intersection of the inner longitudinal margins of the frame legs 11 and 12. It is noted that the receiving belt 32 may be of greater width than the feeding belt 23 in order to accommodate transverse movement of several articles at a time from said feeding belt to said receiving belt. The belts may travel at the same rate of speed, although the receiving and upright belts usually have a greater rate of speed than the feeding belt to prevent congestion or overcrowding at the belt intersection. Of course, the former belts preferably have the same travel rate since their coacting flights move in the same general direction. The articles may be removed from the receiving belt in any suitable manner.

The foregoing description of the invention is explanatory thereof and various changes in the size, shape and materials, as well as in the details of the illustrated construction may be made, within the scope of the appended claim, without departing from the spirit of the invention.

What we claim and desire to secure by Letters Patent is:

A conveyor system including an angular unitary frame, endless belts carried by the frame in angular relation to each other, pulleys within said frame supporting the ends of the belts within the confines of said frame, one of the pulleys of the second of said belts being mounted between the flights of the first of said belts for supporting the upper flight of said second belt below and in close proximity to the upper flight of said first belt, and an upright conveyor overlying and extending transversely of said first belt for engagement by articles carried by said belt, the conveyor extending laterally beyond said first belt in overlying parallel relation to one of the longitudinal margins of said second belt for directing articles from said first belt onto said second belt, said conveyor including an endless belt, upright pulleys mounted on said frame for supporting the ends of the conveyor belt with its inner flight in overlying parallel relation to said longitudinal belt margin, an upright plate supported by said frame between the flights of said conveyor belt to provide a backing for its inner flight, and a horizontal flange at the lower end of the plate for supporting the lower margin of said conveyor belt in spaced relation to said first belt.

References Cited in the file of this patent

UNITED STATES PATENTS

| | | |
|---|---|---|
| 465,463 | Connley et al. | Dec. 22, 1891 |
| 1,716,968 | May | June 11, 1929 |
| 2,047,106 | Lidberg et al. | July 7, 1936 |